United States Patent [19]

Esterowitz et al.

[11] 4,321,559
[45] Mar. 23, 1982

[54] MULTIWAVELENGTH SELF-PUMPED SOLID STATE LASER

[75] Inventors: Leon Esterowitz, Springfield, Va.; Robert C. Eckardt, Waldorf, Md.

[73] Assignee: The United States of America as represented by the Secretary of the Navy, Washington, D.C.

[21] Appl. No.: 137,066

[22] Filed: Apr. 3, 1980

[51] Int. Cl.³ .............................................. H01S 3/16
[52] U.S. Cl. ....................................... 372/41; 372/70
[58] Field of Search ................... 331/94.5 E, 94.5 F, 331/94.5 G

[56] References Cited
PUBLICATIONS

Esterowitz et al, Long-Wavelength Stimulated Emission via Cascade Laser Action in HO:YLF. Appl. Phys. Lett., vol. 35, No. 3 (Aug. 1, 1979) pp. 236–239.

*Primary Examiner*—William L. Sikes
*Attorney, Agent, or Firm*—Robert F. Beers; William T. Ellis; Melvin L. Crane

[57] ABSTRACT

A new class of solid-state laser which employs self-pumping from internal laser transitions to achieve inversion in other transitions. A LiYF$_4$ laser having an activator of trivalent holmium is pumped by a standard flashlamp or by a doubled Nd laser to populate the $^5S_2$ manifold. Inversion is achieved between $^5S_2$ and $^5I_5$ at 1.4 μm. Employing appropriate mirrors, inversion is then produced between $^5I_5$ and $^5I_7$ at 1.7 μm. Finally inversion is obtained between $^5I_7$ and $^5I_8$ at 2.06 μm.

6 Claims, 3 Drawing Figures

MULTIWAVELENGTH SELF-PUMPED SOLID STATE LASER

BACKGROUND OF THE INVENTION

This invention relates to solid-state lasers and more particularly to solid-state lasers that employ self-pumping from internal laser transitions to achieve inversion in other transitions.

In the cascade process, laser transitions between levels in the upper manifolds are used to achieve inversion in lower-lying manifolds with resultant multiwavelength sequential emission. A number of cascade schemes have been observed in noble-gas lasers, and the cascade process is currently one of the more attractive method of obtaining 16 $\mu$m radiation from $CO_2$ lasers.

In an article in Proc. IEEE, 1974, pp. 17-31, Krupke performed calculations of laser transitions in trivalent Nd- and Dy- doped solids and discussed the possibility of cascade laser action in the mid-IR range. Experimental work on multiwavelength emission in solids via the cascade technique has been reported in Soviet Journal Quantum Electronics 5, 117, 1975; and by M. V. Petrov and A. M. Tkachuk, Optical Spectros (USSR) 45, 81, 1978. Laser action was observed between $^4S_{3/2}$ $^4I_{9/2}$; $^4S_{3/2} \rightarrow ^4I_{11/2}$; and $^4I_{11/2} \rightarrow ^4I_{13/2}$ transitions at 1.75, 1.23, and 2.87 $\mu$m, respectively. This work was limited to wavelengths shorter than 3 $\mu$m. Furthermore the multiwavelength emission was observed with flashlamp pumping where it is difficult to unambiguously identify the degree of participation of the cascade process.

The longest wavelength previously observed for a rare-earth-doped laser was reported by Johnson and Guggenheim in Applied Physics Letters (23) 96, 1973. They obtained laser oscillation with $Dy^{3+}$ in $BaY_2F_8$ at 77° K. The $^6H_{13/2}$ $^6H_{15/2}$ transition at 3.02 $\mu$m had a threshold of 510J when pumped with a helical flashlamp. In their work they discuss the dominance of nonradiative decay rates due to multiphonon emission for transitions below 3000 cm$^{-1}$ (~3.3 $\mu$m). Fluorescence at these long wavelengths is overwhelmed by nonradiative relaxation, and Johnson and Guggenheim conclude that laser emission at these long wavelengths is unlikely. In the prior art it has been assumed that the upper laser level had to have a long fluorescent lifetime with a small nonradiative decay rate.

SUMMARY OF THE INVENTION

A solid-state laser which employs self-pumping from internal laser transitions to achieve inversion in other transitions. The process proceeds in a cascade manner down through the activator-ion energy levels to produce multi-wavelength stimulated emission. By selectively choosing cavity mirrors that by-pass unwanted transitions, transitions of desired wavelengths may be chosen. Cascade laser action greatly expands the number and range of wavelengths at which stimulated emission can be obtained. In the cascade process, laser transitions occur between levels in the upper manifold with resultant multiwavelength sequential emission.

The features of this invention have been set forth in an article "Long-wavelength Stimulated Emission via Cascade Laser Action in Ho:YLF" by L. Esterowitz, R. C. Eckardt, and R. E. Allen in Applied Physics Letters, 35, (3), pp. 236-239, Aug. 1, 1979, which is incorporated herein by reference.

DETAILED DESCRIPTION

Figure 1:
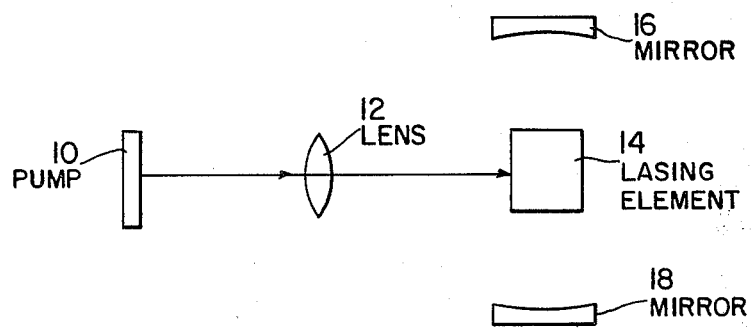
FIG. 1 is a diagram of a laser system.

FIG. 1 is a simple laser system using a flashlamp pump 10 which directs pump radiation pulses through a focusing lens 12 onto a solid-state laser element 14. A fully reflective mirror 16 and a partially reflective mirror 18 are used to form the laser cavity. The mirrors are selected to by-pass unwanted laser transitions and to reflect those desired transitions. Different sets of cavity mirrors may be used for operation at different wavelengths. The pump source is chosen such that it resonantly pumps the laser element on the desired energy line required to produce the transitions at the proper energy levels. It has been determined that a particular class of solid-state laser can be initially excited at a particular high energy level with subsequent excitation to successive lower energy levels until reaching the ground state. Such a process is known as the cascade process.

In general, the cascade process can proceed down through the activator-ion energy levels to produce sequential multiwavelength stimulated emission. There is a large degree of flexbility in choosing the desired transitions since in principle one can selectively choose the reflectivity of the cavity mirrors to bypass unwanted transitions. Laser action between intermediate levels improves the efficiency of a laser transition originating in a low-lying energy state since losses associated with the alternative modes of decay from the upper manifolds to levels other than the desired one are avoided. Laser oscillation between intermediate levels will also increase the rate of transition to the initial level of the desired laser transition and help overcome competing decay processes. Cascade action not only populates the initial level of the subsequent transition but also depletes the terminal level of the previous laser transition. This symbiotic relationship of a sequential lasing transitions should prove advantageous in many systems in reducing threshold requirements and avoiding self-termination of laser action in transitions with long-terminal-level lifetimes. Another advantage is that since the energy transfer to the initial laser level is radiative, crystal thermal loading is minimized. It has been determined that laser elements suitable for cascade laser action are those rare-earth-doped solids in which the rare-earth element serves as an activator and the host matrix may be selected from oxide, glass, or fluoride hosts. It is therefore possible to make active laser elements from activator ions such as holmium, Ho; dysprosium, $Dy^{+3}$; erbium, $Er^{+3+}$; europium, $Eu^{+3}$; neodymium, $Nd^{+3}$, praseodymium $Pr^{+3}$; samarium, $Sm^{+3}$; terbium, $Tb^{+3}$; and thulium, $Tm^{+3}$, or combinations of the above for multiple doping. Some host materials are YLF, YAG, YALO, $CaF_2$, $LaF_3$ and glass.

The cascade laser action is set forth by the following example. The laser element is formed by use of trivalent holmium in YLF having the formula 1% Ho: YLF and made into a crystal 8×8×10 mm³ in size. The second harmonic of Nd: glass pumps the laser crystal which excites the ions into the $^5F_4$ manifold which is in thermal equilibrium with the $^5S_2$ manifold. The energy levels of this ion have been well characterized as having the optical properties of the crystalline host. The cascade process in this system was carried out by obtaining laser oscillation on the $^5S_2 \rightarrow ^5I_5 \rightarrow ^5I_7$ transitions at 1.392 and 1.673 μm by use of a cavity comprising the two identical dielectric mirrors with 0.5-m radius of curvature spaced 9 cm apart. The coatings had a reflectivity of 85% at 1.392 μm and 98.5% at 1.673 μm. The energy-level transitions are shown on the energy diagram, FIG. 3(a).

The cascade process was also obtained by laser oscillation on the $^5S_2 \rightarrow ^5I_5 \rightarrow ^5I_6$ transitions at 1.392 and 3.914 μm. The cavity used for the second cascade scheme consisted of a 0.5-m gold mirror and a flat dielectric mirror that had a reflectivity of 94% at 1.392 μm, 15% at 1.673 μm, and 98% at 3.914 μm. The energy level transitors for this cascade process is shown on energy diagram FIG. 3(b).

The doubled output of a Nd:glass (ED-2) laser was used to transversely pump the 1% Ho:YLF ($8 \times 8 \times 10$ mm$^3$) crystal. The pump laser was tuned in wavelength with two intracavity dispersing prisms and a 2.6-mm-diam. limiting aperture. Q switching was accomplished with a solution of Eastman dye No. 14617 dissolved in dichlorethane. A KD*P crystal internal to the laser cavity was used for second-harmonic generation. The green pulses were typically of 30-nsec duration, and the 535-nm wavelength matched the absorption peak ($\alpha = 12$ cm$^{-1}$) of the $^5F_4$ manifold. This pump beam was focused with a cylindrical lens to a line image 0.4 mm wide at the surface of the crystal.

Figure 2:
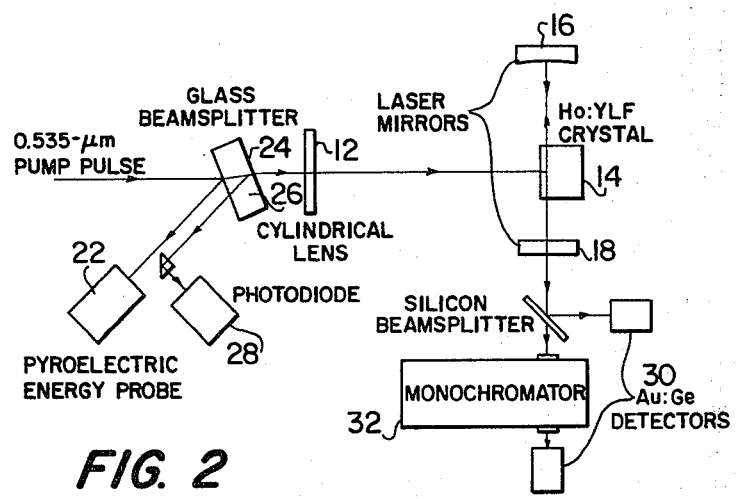
FIG. 2 is a diagram of a laser system with energy detectors for measuring the pump radiation and the output radiation.

In the experimental setup (FIG. 2), the energy of the green pump beam was monitored with a pyroelectric detector using a beamsplitter 24. The back surface reflection from the beamsplitter was directed to a fast photodiode 28 to allow observation of the time dependence and to provide synchronization signals for the other detectors. The output of the holmium cascade laser was monitored with gold-doped germanium detectors 30 which had 2 nsec rise times. A ¼-m monochromator 37 with a 150-line/mm grating was used for the wavelength determination along with narrow-band filters. The uncertainty of the wavelengths given here is 1 nm.

With either set of mirrors, the threshold for 1.392 μm laser oscillation occurred when 1 mJ of energy wa absorbed in the active cavity volume (about 10% of the total incident pump beam energy). The fundamental transverse mode (TEM$_{oo}$) could be obtained by aligning the resonant cavity axis near the edge, and single-low-order modes TEM$_{01}$-TEM$_{02}$ were observed as the cavity axis was moved away from the edge of the crystal. Using the first set of cavity mirrors and increasing the pump energy to 15 mJ (i.e., 1.5 mJ effectively absorbed) yielded 175 μJ in the 1.392 μm laser line ($^5S_2 \rightarrow ^5I_5$) and 90 μJ in the 1.673 μm laser line ($^5I_5 \rightarrow ^5I_7$). Thus even with pump energies only 50% above threshold, a conversion efficiency of 17% was achieved (effectively absorbed pump radiation) for simultaneous laser operation at the two wavelengths. In addition, at this pump energy, greater than 50% conversion was obtained in going from the 1.392 to 1.673 μm laser transition. The latter is the first room-temperature demonstration of laser action in the $^5I_5 \rightarrow ^5I_7$ transition.

The difference in wavelength between the 1.392 and 3.914 μm transitions results in different mode dimensions. For the experimental conditions employed here, threshold was not reached on the second transition when the first was oscillating in the TEM$_{oo}$ mode. Due to the larger beam waist at the longer wavelength, it was necessary that the first transition be allowed to oscillate in a combination of the TEM$_{oo}$ and TEM$_{01}$ modes. The low reflectivity of the second set of mirrors at 1.673 μm prevented laser action at that wavelength. Threshold for the 3.914 μm laser oscillation occurred at 18 mJ green pump energy. Pumping with 20 mJ green gave 600 μJ of 1.392 μm and 25 μJ of 3.914 laser output. The 1.392 μm pulse had a 150 nsec duration. Laser oscillation at 3.914 μm was observed to start between 1.5 and 4 μsec after the green pulse. This large time variation arose from being close to threshold, and decreased with increasing pump energy.

Figure 3:
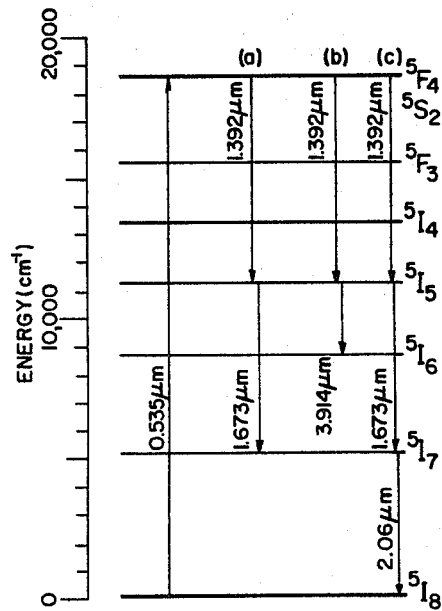
FIG. 3 is an energy level diagram for a Ho YLF laser showing relevant levels and pumping transitions for two cascade laser schemes.

FIG. 3, line (c), shows an energy diagram for still another cascade laser process. The $^5S_2$ manifold is populated by the pump laser. Inversion is then achieved between $^5S_2$ and $^5I_5$ at 1.392 μm. Employing the appropriate cavity mirrors inversion is then produced between $^5I_5$ and $^5I_7$ at 1.673 μm followed by inversion between $^5I_7$ and $^5I_8$ at 2.06 μm which is the laser transition commonly lased in alphabet YLF.

It is obvious from the above examples that by using the same laser element and the same pump energy with different cavity mirrors, different laser outputs may be obtained. In FIG. 3, lines (a) and (b), two different outputs are obtained in each case. In FIG. 3, line (c), there are three different outputs. Most important is the fact that a solid-state laser can be used from which an output of 3.914 μm can be obtained. In each example, laser transitions between levels in the upper manifolds are used to achieve inversion in lower-lying manifolds by self-pumping with resultant multiwavelength sequential emission. Cascade laser action in rare-earth-doped solids greatly expand the number and range of wavelengths at which stimulated emission can be obtained. It is believed that the generation of laser radiation at 3.914 μm is the longest rare-earth laser wavelength obtained to date.

The cascade process discussed here can avoid the severe limitations of standard excitation techniques for stimulated emission at these long wavelengths. Previous requirements that the upper laser level have a long fluorescent lifetime with a small nonradiative decay rate are no longer necessary since direct and rapid transfer of the excited state population to the desired level can be accomplished by the cascade laser process. Q-switching the initial cascade transition can further increase the pumping speed to the upper level of the subsequent transition. Inversion of the latter transition can then be obtained before nonradiative decay modes depopulate upper laser level. Q-switching may therefore be required when the upper-level fluorescent lifetime is very short. The cascade process also allows a much wider choice of host material because it is possible to relax the requirement that optical phonon energies of the crystal and/or the orbital coupling of the ion to the lattice be small.

Obviously many modifications and variations of the present invention are possible in light of the above teachings. It is therefore to be understood that within the scope of the appended claims the invention may be practiced otherwise than as specifically described.

What is claimed and desired to be secured by Letters patent of the United States is:

1. An optically-pumped solid-state laser comprising:

a resonant cavity formed by radiation reflective elements opposing each other on a common axis to form a reflective path therebetween, said reflective elements being specially designed to reflect radiation substantially only at or about certain wavelengths representing a cascade of lasing transitions from at least one upper energy level to an intermediate energy level and from said intermediate level to a lower energy level;

a laser medium disposed in said cavity which lases in at least one upper transition and in at least one lower transition;

means for resonantly pumping energy to said laser medium for producing a population inversion in a high-lying energy state to produce said upper transition; and wherein said reflective elements operate to reflect radiation from said pump laser medium at a wavelength which will sustain stimulated emission at the transition wavelength from said upper energy level to said intermediate level in said cascade and then reflect radiation at a wavelength which will sustain stimulated emission at the transition wavelength from said intermediate level to said lower level in said cascade.

2. An optically pumped laser as claimed in claim 1 wherein:

said laser medium lases at one upper energy transition and at more than one lower energy transition.

3. An optically pumped laser as claimed in claim 1 wherein:

said laser medium is made of a host material selected from the group consisting of YLF, YAG, YALO, $CaF_2$, $LaF_3$ and glass and includes activator ions selected from a group consisting of $Dy^{+3}$, $Er^{+3}$, $Eu^{+3}$, $Nd^{+3}$, $Pr^{+3}$, $Sm^{+3}$, $Tb^{+3}$, and $Tm^{+3}$.

4. An optically pumped laser as claimed in claim 1 wherein:

said laser material is made from a host material of YLF and includes an Ho activator ion.

5. An optically pumped laser as claimed in claim 4 wherein:

said laser medium is Ho:YLF;

said upper energy transition is produced by an inversion between $^5S_2$ and $^5I_5$ energy levels at 1.392 μm, and said lower energy transition is produced by an inversion between $^5I_5$ and $^5I_6$ energy levels at 3.914 μm, and said radiation reflective elements are reflective only at or about said energy levels of 1.392 μm and 3.914 μm.

6. An optically pumped laser as claimed in claim 5 in which:

said laser medium is Ho:YLF, said upper energy transition is produced by an inversion between $^5S_2$ and $^5I_5$ energy levels at 1.392 μm, an inversion between $^5I_5$ and $^5I_7$ μm energy levels at 1.673 μm, and by an inversion between $^5I_7$ and $^5I_8$ energy levels at 2.06 μm, and said radiation reflective elements are reflective only at or about 1.392 μm, 1.673 μm and 2.06 μm.

* * * * *